(12) United States Patent
Haneji et al.

(10) Patent No.: US 10,194,393 B2
(45) Date of Patent: Jan. 29, 2019

(54) MOBILE RADIO COMMUNICATIONS DEVICE, NETWORK DEVICE AND METHOD FOR EMPLOYING POWER SAVING MODE

(71) Applicant: NEC Corporation, Tokyo (JP)

(72) Inventors: Hayato Haneji, Berkshire (GB); Iskren Ianev, Berkshire (GB); Yannick Lair, Berkshire (GB)

(73) Assignee: NEC Corporation, Tokyo (JP)

( * ) Notice: Subject to any disclaimer, the term of this patent is extended or adjusted under 35 U.S.C. 154(b) by 231 days.

(21) Appl. No.: 15/033,610

(22) PCT Filed: Oct. 28, 2014

(86) PCT No.: PCT/JP2014/079379
§ 371 (c)(1),
(2) Date: Apr. 29, 2016

(87) PCT Pub. No.: WO2015/064765
PCT Pub. Date: May 7, 2015

(65) Prior Publication Data
US 2016/0286491 A1 Sep. 29, 2016

(30) Foreign Application Priority Data

Oct. 31, 2013 (GB) .................................. 1319226.5

(51) Int. Cl.
*H04W 52/02* (2009.01)
*H04W 28/02* (2009.01)
(Continued)

(52) U.S. Cl.
CPC ... *H04W 52/0235* (2013.01); *H04W 28/0221* (2013.01); *H04W 52/0212* (2013.01);
(Continued)

(58) Field of Classification Search
CPC ............. H04W 52/02; H04W 28/0221; H04W 52/0221; H04W 52/0235; H04W 88/02;
(Continued)

(56) References Cited

U.S. PATENT DOCUMENTS 8,555,100 B2 * 10/2013 Liao ...................... G06F 1/3203
713/324
2002/0086692 A1 * 7/2002 Chheda ..................... H04L 1/20
455/522
(Continued)

FOREIGN PATENT DOCUMENTS

JP 2002-7002 A 1/2002
JP 2010-251984 11/2010
(Continued)

OTHER PUBLICATIONS

Notification of Reasons for Refusal dated May 9, 2017, by the Japanese Patent Office in counterpart Japanese Patent Application No. 2016-549893.

(Continued)

*Primary Examiner* — Jenee Holland
(74) *Attorney, Agent, or Firm* — Finnegan, Henderson, Farabow, Garrett & Dunner, L.L.P.

(57) ABSTRACT

The invention provides for mobile radio communications device (10) for operation within a mobile radio communications network and arranged to employ one of a plurality of possible power saving modes, and arranged to send non-access stratum or access stratum signalling (14) to the network including an indication of at least one of the said plurality of possible power saving modes, and responsive to which indication the network (12) is arranged to return confirmation (16) of the power saving mode to be employed by the mobile radio communications device (10), the mobile radio communications device (10) further being arranged to (Continued)

receive the said confirmation (16) and to initiate operation of the confirmed power-saving mode (26; 38; 44).

12 Claims, 5 Drawing Sheets

(51) Int. Cl.
H04W 88/02 (2009.01)
H04W 4/70 (2018.01)

(52) U.S. Cl.
CPC .......... H04W 52/0216 (2013.01); *H04W 4/70* (2018.02); *H04W 88/02* (2013.01); *Y02D 70/00* (2018.01); *Y02D 70/1224* (2018.01); *Y02D 70/21* (2018.01)

(58) Field of Classification Search
CPC ..... H04W 4/70; Y02D 70/00; Y02D 70/0021; Y02D 70/1224; Y02D 70/21
See application file for complete search history.

(56) References Cited

U.S. PATENT DOCUMENTS

| | | | | |
|---|---|---|---|---|
| 2003/0073457 A1* | 4/2003 | Wang | ............... | H04W 48/18 455/552.1 |
| 2004/0041538 A1* | 3/2004 | Sklovsky | ............ | H04W 52/0264 320/127 |
| 2004/0153676 A1* | 8/2004 | Krantz | ............. | G06F 1/3203 713/300 |
| 2004/0198383 A1* | 10/2004 | Choi | ............. | H04W 80/04 455/456.1 |
| 2004/0204175 A1* | 10/2004 | Karaoguz | ............. | H04B 1/1615 455/572 |
| 2004/0224728 A1* | 11/2004 | Dacosta | ............. | H04W 52/0229 455/574 |
| 2004/0242286 A1* | 12/2004 | Benco | ............. | H04M 3/28 455/574 |
| 2006/0240799 A1* | 10/2006 | Kim | ............. | H04B 1/1615 455/343.2 |
| 2009/0031154 A1* | 1/2009 | Ikawa | ............. | G06F 1/3221 713/320 |
| 2009/0125732 A1* | 5/2009 | Oya | ............. | H04L 12/66 713/300 |
| 2009/0137260 A1* | 5/2009 | Son | ............. | H04W 52/0212 455/466 |
| 2010/0023717 A1* | 1/2010 | Jinno | ............. | G06F 1/3221 711/162 |
| 2010/0046631 A1* | 2/2010 | Raveendran | ....... | H04N 21/4348 375/240.25 |
| 2010/0046637 A1* | 2/2010 | Raveendran | ....... | H04N 21/4348 375/240.26 |
| 2010/0115259 A1* | 5/2010 | Elsila | ............. | G06F 1/3203 713/100 |
| 2010/0299547 A1* | 11/2010 | Saika | ............. | G06F 1/3203 713/324 |
| 2010/0323753 A1* | 12/2010 | Imamura | ............. | H04W 52/028 455/552.1 |
| 2011/0173474 A1* | 7/2011 | Salsbery | ............. | G06F 1/206 713/323 |
| 2012/0092714 A1* | 4/2012 | Suzuki | ............. | G06F 3/1212 358/1.15 |
| 2012/0106349 A1* | 5/2012 | Adjakple | ............. | H04W 52/0206 370/241 |
| 2012/0320791 A1* | 12/2012 | Guo | ............. | H04W 52/0212 370/254 |
| 2012/0322515 A1 | 12/2012 | Hwang et al. | | |
| 2013/0003698 A1* | 1/2013 | Olvera-Hernandez | ............. | H04W 8/082 370/331 |
| 2013/0047014 A1* | 2/2013 | Ise | ............. | G06F 3/1221 713/320 |
| 2013/0073884 A1* | 3/2013 | Ulmer | ............. | G06F 1/3203 713/320 |
| 2013/0100895 A1 | 4/2013 | Aghili et al. | | |
| 2013/0229964 A1* | 9/2013 | Chakravarthy | ... | H04W 52/0212 370/311 |
| 2013/0238917 A1* | 9/2013 | Zhong | ............. | H04W 52/0225 713/320 |
| 2013/0295986 A1* | 11/2013 | Mueck | ............. | H04W 48/18 455/552.1 |
| 2014/0235256 A1 | 8/2014 | Takeda et al. | | |
| 2015/0156719 A1* | 6/2015 | Quan | ............. | H04W 52/0254 370/311 |
| 2016/0021639 A1* | 1/2016 | Ma | ............. | H04W 52/0216 455/458 |
| 2016/0057701 A1* | 2/2016 | Choi | ............. | H04W 76/28 370/311 |

FOREIGN PATENT DOCUMENTS

| | | |
|---|---|---|
| JP | 2013-520102 | 5/2013 |
| JP | 2013-176063 | 9/2013 |
| WO | WO 2007/021115 A1 | 2/2007 |
| WO | WO 2011/085802 A1 | 7/2011 |
| WO | WO 2011/119680 A2 | 9/2011 |
| WO | WO 2012/137033 A1 | 10/2012 |
| WO | WO 2013/054591 A1 | 4/2013 |

OTHER PUBLICATIONS

Decision to Grant Patent dated Aug. 8, 2017, issued by the Japanese Patent Office in counterpart Japanese Patent Application No. 2016-549893.

International Search Report and Written Opinion dated Oct. 31, 2013, in corresponding PCT International Application.

3GPP TS 22.368 V12.2.0, 3$^{rd}$ Generation Partnership Project; Technical Specification Group Services and System Aspects; Service requirements for Machine-Type Communications (MTC); Stage 1 (Release 12), Mar. 2013.

3GPP TR 23.887 V1.2.0, 3$^{rd}$ Generation Partnership Project; Technical Specification Group Services and System Aspects; Machine-Type and other mobile data applications Communications enhancements (Release 12), Aug. 2013.

Search Report issued in the Priority GB Application dated Feb. 17, 2014.

3GPP SA WG2 Meeting #98, S2-133071, "Evaluation of UE power saving solutions", pp. 1-8.

Extended European Search Report dated May 18, 2017, by the European Patent Office in counterpart European Patent Application No. 14857831.3.

3GPP TR 23.887 V1.3.0(Nov. 2013), 3rd Generation Partnership Project, Technical Specification Group Services and System Aspects, Machine-Type and other mobile data applications Communications enhancements (Release 12), Technical Report, XP050725409, pp. 1-153, (2013) URL:http://www.3gpp.org/ftp/tsg_sa/WG2_Arch/Latest_SA2_Specs/Latest_draft_S2_Specs/.

\* cited by examiner

MOBILE RADIO COMMUNICATIONS DEVICE, NETWORK DEVICE AND METHOD FOR EMPLOYING POWER SAVING MODE

CROSS-REFERENCE TO RELATED PATENT APPLICATIONS

This application is a National Stage Entry of International Application No. PCT/JP2014/079379, filed Oct. 28, 2014, which claims priority from GB 1319226.5, filed Oct. 31, 2013. The entire contents of the above-referenced applications are expressly incorporated herein by reference.

TECHNICAL FIELD

The present invention relates to a mobile radio communications device arranged to employ a power saving mode and a mobile radio communications network device arranged to communicate with the mobile radio communications device in relation to the power saving mode, and to related network systems and methods of operation.

BACKGROUND ART

Power consumption is an important feature for mobile terminals using a battery power supply and also for mobile terminals using external power supply. Its importance increases with the continued growth of device populations such as for example the proliferation of Machine Type Communication (MTC) devices and also the deployment of devices in ever more demanding situations and environments. For example, for Machine To Machine (M2M) use cases, such as remote sensors that run on battery-power, there are significant cost implications for on-site exchange (or re-charge) of the batteries for a large device population and the battery lifetime may even determine the device's lifetime if it is not foreseen to re-charge or replace the battery.

Discussion within the 3$^{rd}$ Generation Partnership Project (3GPP) for mobile communications have resulted in numerous study and work items related to such problems. 3GPP Services and Systems Aspects (SA2) (architecture) group has discussed UE power consumption optimisation for energy saving and battery power consumption optimisation (UEPCOP) within the MTC work item. The main objective study is identified as:

Lower UE Power Consumption as per the service requirements defined clause in clause 7.1.1 of Technical Specification TS 22.368.

In particular, 3GPP SA2 has already identified several proposals for UE power consumption optimization in Technical Report TR 23.887.

One proposal outlined in TR23.887, at section 7.1.3.3, relates to employment of a Power Saving Mode/State (PSM) to be deployed by a mobile terminal for reducing its power consumption. That mode described is similar to a power-off mode, but the mobile terminal remains registered with the network and so there is no need to re-attach or re-establish Packet Data Network (PDN) connections. A mobile terminal in PSM is not immediately reachable for Mobile Terminating (MT) services. However, such a terminal in PSM can be made available for MT services but only for the period of an Active Time after a Mobile Originated (MO) event such as data transfer or signalling, e.g. after a periodic Tracking Area Update/Routing Area Update (TAU/RAU) procedure.

When the mobile terminal is use the PSM, a request is made for an Active Time value, and a request for a Periodic TAU/RAU Timer value, during Attach and TAU procedures. The mobile terminal and a network device such as a Mobile Management Entity/Serving GPRS Support Node MME/SGSN start the Active timer with the Active Time value that is allocated by the network when mobile terminal is transiting from a Connected mode to an Idle mode. When the Active timer expires, the mobile terminal deactivates its Access Stratum functions and enters PSM. In PSM, due to deactivation of the Access Stratum functions, the mobile terminal stops all idle mode procedures, but continues to run the periodic TAU/RAU timer. The mobile terminal will be arranged to resume Access Stratum functions and idle mode procedures before the periodic TAU/RAU timer expires for performing the periodic TAU/RAU procedure as applicable. Further, the mobile terminal may resume idle mode procedures and Access Stratum functions any time during PSM, for example e.g. for MO communications.

When the Active Timer value expires, the MME/SGSN can determine that the mobile terminal has entered PSM and so is not available for paging.

In PSM the mobile terminal is in Idle mode and the MME/SGSN will treat the mobile terminal as if registered, but not reachable. The Access Stratum functions of the mobile terminal are considered as deactivated during PSM.

An alternative Power Saving scenario is discussed at section 7.1.3.4 of TR23.887 and based on Attach/Detach procedures.

This proposal is based on the functionality that the mobile terminal attaches to the network to communicate and, after the communication session, the mobile terminal detaches from the network and switches off its 3GPP modem (MT) during a period to save mobile terminal power. However, the mobile terminal will periodically perform the Attach and Detach procedures.

Two particular examples are discussed and the first comprises Network Assisted Power Saving (NAPS) and is outlined at section 7.1.3.4.3.2 of TR23.887.

To summarise, many mobile terminals (e.g. MTC devices for vendor machines, electricity metering, weather sensors, etc) exhibit expected/scheduled communication patterns in which the device and Application server communicate at regular intervals only (e.g. once a day or once a week etc). There is therefore a possibility to save energy if the mobile terminal detaches in between these occasions, and in addition to the reduction in the usage of network resources. As a service, the operator may offer the Machine-to-Machine (M2M) service provider the possibility of to simplifying such regular communication. Based on agreement as to how often the communication needs to occur, the operator can pre-configure information in the network, and optionally the mobile terminal, for assisting regular attach/detach of the mobile terminal. The NAPS proposal provides a mechanism to enhance the existing Network Initiated Detach procedure for such scenarios. Also, this function allows the mobile terminal to propose a time for remaining attached (identified as User Equipment (UE) power saving active timer) and this allows the network to provide the mobile terminal with a new timer (UE power saving wakeup timer). The mobile terminal can then re-attach to the network when the timer has expired. As the mobile terminal detachment and re-attachment is performed by way of network-control, it is possible for mobile terminal to look to achieve both battery-power saving, and network signalling optimization, while retaining network control of when the mobile terminal should look to perform re-attachment.

The second example, referred to at section 7.1.3.4.3.3 of TR23.887 as Implicit Detach, is based on the coordinated (i.e. synchronized) transition from an attached state to a detached state in both the network and the mobile terminal but without explicit signalling. The Implicit Detach is performed soon after communication is completed in order to avoid long idle state periods as commonly arising, for example the periodic TAU/RAU period at UE, the reachable tinier+detach timer at the network, which can be in order of hours.

Generally, to ensure the coordinated implicit transition to a detached state, the configuration of two main parameters in the network and in the mobile terminal is required first a certain "implicit detach time" is identified and secondly an "event/point" when this implicit detach timer starts. The term "implicit detach time" refers to the time duration from a certain event (start point) until the mobile terminal and network implicitly transfer to detached state.

For implicit detach coordination with the network, and when a mobile terminal is configured for Implicit Detach, either the mobile terminal needs to indicate its Implicit Detach capability configuration to the network (in NAS signalling for example); or the MME can get the mobile terminal's Implicit Detach capability configuration from its subscription information (e.g. provisioned by the M2M service capability layer from the Service Capability Server (SCS).

In such configuration, the implicit detach time is either exchanged between the network and the mobile terminal, takes the value of the "grant time interval" or the "communication window" if time-controlled communication, or takes the value of the Periodic TAU timer.

In the latter case the network allocates the Periodic TAU timer by taking into account the subscription information or configuration.

Thus various solutions for mobile terminal power saving and optimization are proposed in TR23.887 and each solution has its specific characteristics and suits specific operating scenarios.

For example, the Power Saving Mode/State of section 7.1.3.3 permits long battery lifetime for stationary and moving UEs with infrequent communications needs. Although the UE is kept attached, the UE is not reachable alter active timer expiry until the next periodic TA/RA update. However, the UE can still be reached via SMS messages, which can be delivered when the UE wakes up as it remains active for the active time after contacting the network.

However, the Power Saving Mode/State can add signalling load due to the polling of the network with the periodic updates even when there is no uplink or downlink data to exchange. This makes the Power Save State/Mode not suitable for scenarios where the mobile terminal needs to transmit very rarely, such as for example, once a day or even more infrequently (i.e. utility meters, some e-health devises etc).

The Attach/Detach solutions of section 7.1.3.4 involve detachment of the mobile terminal detached and so does not generate signaling load onto the system (e.g. RAU/TAU). Also, the SGSN/MME does not need to retain the mobile terminal's context and this can serve to free-up many network-side resources. Also, with the implicit detach approach a further saving in the signaling can be achieved as there is no need for explicit detach signaling. The mobile terminal and the network can then perform a coordinated implicit detach.

It is clear that the attach/detach approach would suit MTC scenarios where the mobile terminal communicates very infrequently and it is tolerant to paging (such as for example utility meters etc.). Indeed, this is recognized in Technical Specification TS22.368, at section 7.1.1 where it is noted that "MTC Devices may or may not be kept attached to the network when not communicating, depending on operator policies and MTC Application requirements."

CITATION LIST

Non Patent Literature

NPL 1: 3rd Generation Partnership Project Technical Specification TS 22.368
NPL 2: 3rd Generation Partnership Project Services and Systems Aspects Technical Report TR 23.887

SUMMARY OF INVENTION

Technical Problem

Power saving procedures therefor offer various advantages, and exhibit various characteristics but which themselves cause potential problems and operational limitations. The invention seeks to provide for mobile and network terminal devices and related network systems and methods of operation having advantages over known devices, systems and methods.

Solution to Problem

According to one aspect of the present invention there is provided a mobile radio communications device for operation within a mobile radio communications network and arranged to employ one of a plurality of possible power saving modes, and arranged to send non-access stratum or access stratum signalling to the network including an indication of at least one of the said plurality of possible power saving modes, and responsive to which indication the network is arranged to return confirmation of the power saving mode to be employed by the mobile radio communications device, the mobile radio communications device further being arranged to receive the said confirmation and to initiate operation of the confirmed power-saving mode.

Known mobile terminal power saving solutions such as those outlined above are beneficial and they are more or less applicable for specific use cases. However, in order to allow the mobile terminal to take full advantage of such power-saving solutions the invention advantageously allows for mobile terminal power-saving mode control advantageously based on the mobile terminal preference and the network considerations (i.e. subscription, resources, capability).

The invention proves advantageous insofar as the mobile radio communications device can be arranged to employ a power-saving mode best suited to its own characteristics and/or new network considerations.

In particular, the invention is arranged such that the said indication comprises an indication of preferred power saving mode.

Advantageously, non-access stratum signalling is employed and comprises any one or more of an Attach Request, a Tracking Area Update request or a Routing Area Update request.

Advantageously, the non-access stratum signalling can also include the Periodic Update Timer and/or an Active Timer value.

Further, the mobile radio communications device can be arranged to receive the said confirmation by way of non-access stratum signalling.

Again, the said non-access stratum signalling as received by the mobile radio communications device can comprise any one or more of an Attach Accept message, a Routing Area Update accept message or a Tracking Area Update accept message.

Again, confirmation of the Periodic Update Timer and/or Active Timer values can also be included within the non-access stratum signalling received from the network and containing confirmed power-save mode.

Preferably, and after receipt of the confirmed power-saving mode from the network, the mobile radio communications device can be arranged to enter idle mode.

Preferably, the mobile radio communications device can be arranged to initiate an active timer value confirming active time prior to entry into a power saving state.

Further, this mobile radio communications device can be arranged to activate a Periodic Update Timer value serving to determine when the mobile radio communications network is to exit a power-saving state.

Preferably, and subsequent to the mobile radio communications device leaving the power saving state, the mobile radio communications device can be arranged to issue a Routing Area Update request or Tracking Area Update request.

Also, the further Routing Area Update request or Tracking Area Update request can include an indication of at least one of the plurality of possible power-saving modes for later selection by the network.

According to another arrangement, the said at least one of a plurality of possible power saving modes comprises a detach procedure and, preferably, an implicit detach procedure.

Advantageously, the mobile radio communications device can be arranged to initiate an active timer period prior to the implicit detach from the network.

As a further option, the detach procedure can comprise an explicit detach procedure in which the mobile radio communications device is arranged to initiate an active tinier period prior to sending a detach request to the network.

In particular, the said indication of possible power save mode can comprise an indication of a plurality of power save modes and also a preference indicator to identify at least one preferred power-save mode.

According to another aspect of the present invention there is provided a mobile radio communications network device for communicating with a mobile radio communications device within a mobile radio communication network environment, and arranged to determine which of the plurality of possible power saving modes is employed by the mobile radio communications device, the mobile radio communications network device being arranged to receive non-access stratum or access stratum signalling from the mobile radio communications device and including an indication of at least one of the said plurality of possible power saving modes and, responsive to the said indication, the mobile radio communications network device being arranged to return confirmation of the power saving mode to be employed by the mobile radio communications device.

The invention proves advantageous insofar as the mobile radio communications network device can be arranged to control use of a power-saving mode best suited to characteristics of the mobile radio communications device and/or new network considerations.

In particular, the invention is arranged for the provision of the said indication in the form of an indication of preferred power saving mode.

Advantageously the said non-access stratum signalling from the mobile radio communications device can comprise any one or more of an Attach Request, a Tracking Area Update request or a Routing Area Update request.

Advantageously, the non-access stratum signalling can also include a Periodic Update Tinier and/or an Active Timer value.

Further, the said confirmation returned by the mobile radio communications network device can comprise non-access stratum signalling.

Again, the said non-access stratum signalling comprising the said confirmation can comprise any one or more of an Attach Accept message, a Routing Area Update accept message or a Tracking Area Update accept message.

Again, confirmation of the Periodic Update Timer and/or Active Timer values can also be included within the non-access stratum signalling received at, and sent from, the mobile radio communications network device.

Preferably, and subsequent to the mobile radio communications device leaving the power saving state, the mobile radio communications network device is arranged to issue a Routing Area Update request or Tracking Area Update request.

Preferably, the further Routing Area Update request or Tracking Area Update request can include an indication of at least one of the plurality of possible power saving modes for later selection by the network.

According to another arrangement, the said at least one of a plurality of possible power saving modes can comprise a detach procedure and, preferably, an implicit detach procedure.

According to yet another aspect of the present invention there is provided a mobile radio communications system employing a mobile radio communications device and mobile radio communications network device as outlined above.

According to a further aspect of the present invention, there is provided a method of controlling a mobile radio communication device for operation within a mobile radio communications network environment and arranged to employ one of a plurality of possible power saving modes, including the step of sending a non-access stratum signal or access stratum signal to the network including an indication of at least one of the said plurality of possible power saving modes and, responsive to which indication, the network returns confirmation of the power-saving mode to be employed by the mobile radio communications device, and further including the step of receiving the said confirmation from the network and initiating the confirmed power-saving mode in the mobile radio communications device.

As above, the invention can prove advantageous insofar as the mobile radio communications device can be arranged to employ a power saving mode best suited to its own characteristics and/or new network considerations.

In particular, the method of the invention is arranged such that the said indication comprises an indication of preferred power saving mode.

Advantageously, the method can employ non-access stratum signalling which can include any one or more of an Attach Request, a Tracking Area Update request or a Routing Area Update Request.

Advantageously, a Periodic Update Timer and/or an Active Timer value can be included in the non-access stratum signalling.

Further, the method can include the step of mobile radio communications device receiving the said confirmation by way of non-access stratum signalling.

Again, the said non-access stratum signalling can comprise any one or more of an Attach Accept message, a Routing Area Update accept message or a Tracking Area Update accept message.

The method can include confirmation of the Periodic Update Timer and/or Active Timer values within the non-access stratum signalling received from the network and containing the confirmed power-save mode.

After receipt of the confirmed power saving mode from the network, the method can include the mobile radio communications device entering idle mode.

The method can include the step of the mobile radio communications device initiating an Active Timer value confirming active time prior to entry into a power-saving state.

Further, a Periodic Update Timer value can be activated and serving to determine when the mobile radio communications network is to leave the power-saving state.

Preferably, and subsequent to the mobile radio communications device leaving the power-saving state, the method can include the step of the mobile radio communications device issuing a Routing Area Update request or Tracking Area Update request. In particular, the further routing error update request, or tracking area update request, can include an indication of at least one of the plurality of possible power-saving modes for later selection by the network.

Yet further, the method can include the step of initiating an active timer period prior to the implicit detach from the network.

As a further option, the detach procedure can comprise an explicit detach procedure, and the method can include the step of the mobile radio communications device initiating an active timer period prior to sending a detach request to the network.

According to still a further aspect of the present invention, there is provided a method of controlling communication with a mobile radio communications device operating within a mobile communications network environment including a mobile radio communications network device, the method including the step of determining which of the plurality of possible power saving modes is to be employed by the mobile radio communications device and including the step of receiving non-access stratum or access stratum signalling from the mobile radio communication device including an indication of at least one of the said plurality of possible power saving modes and, responsive to the said indication, the network confirming to the mobile radio communications device the power-saving mode to be employed.

In particular, the method of the invention is arranged such that the said indication comprises an indication of preferred power saving mode.

In this method, the said non-access stratum signalling can comprise any one or more of an Attach Request, a Tracking Area Update request or a Routing Area Update request.

Advantageously, the non-access stratum signalling can also include a Periodic Update Timer and/or an Active Timer value.

Further, the confirmation returned from the network can comprise non-access stratum signalling.

The said non-access stratum signalling comprising the confirmation can comprise any one or more of an Attach Accept message, a Routing Area Update accept message or a Tracking Area Update accept message.

Further, the Periodic Update Timer and/or Active Timer values can also be included within the non-access stratum signalling received at, and sent from, the mobile radio communications network device.

Subsequent to the mobile radio communications device leaving the power saving state, the method can include the network issuing a Routing Area Update request or Tracking Area Update request. Preferably, within the method, the further Routing Area Update request or Tracking Area Update request can include an indication of at least one of the plurality of possible power saving modes for later selection by the network.

The method can further control the employment of a detach procedure and, preferably an implicit detach procedure.

As a further option, the detach procedure controlled can comprise an explicit detach procedure in which the mobile radio communications device is arranged to initiate an active timer period prior to sending a detach request for receipt by the network.

As will be appreciated, the present invention can also provide for a method of controlling signalling within a mobile radio communications network and including control of a mobile radio communications device and mobile radio network device as outline above.

As will therefore be appreciated, the invention can provide for a mechanism to control the power save mode in the mobile terminal so that one of the above-mentioned power-save modes of TR23.887 can be applied. This advantageously allows for unifying and controlling the selection of a power-save mode for the mobile terminal and can also allow for selection of a power-save mode that best suits the circumstances of a specific mobile terminal and that is acceptable and available by the network.

As discussed further, a new parameter can be employed by the mobile terminal during Attach or RA/TA update procedure. A mobile terminal can then indicate its power save mode preference in the new parameter 'UE power save mode preference' within the Attach Request message or RA/TA Update Request message. The use of any other existing or new (designated) NAS or AS messages to convey the UE power save mode preference is not excluded.

A new parameter can also be employed by the network (MME/SGSN) and sent to a mobile terminal during the attach procedure or RA/TA procedures. The network (MME/SGSN) can then decide the power save mode for a given mobile terminal based on the latter's preference (UE power save mode preference received from the mobile terminal), on subscription rights and/or on any other network considerations. Then the network (MME/SGSN) would relay the confirmed 'power save mode' to the mobile terminal within the Attach Accept or RA/TA Update Accept messages. The use of any other existing or new (designated) NAS or AS messages to convey the mobile terminal power save mode parameter is not excluded. When Active timer in the mobile terminal expires, the mobile terminal enters a power save mode defined by this 'power save mode' parameter.

Advantageous Effects of Invention

As above, the invention proves advantageous insofar as the mobile radio communications device can be arranged to employ a power-saving mode best suited to its own characteristics and/or new network considerations.

DESCRIPTION OF EMBODIMENTS

The present invention is now described further hereinafter, by way of example only, with reference to the accompanying drawings.

Figure 1:
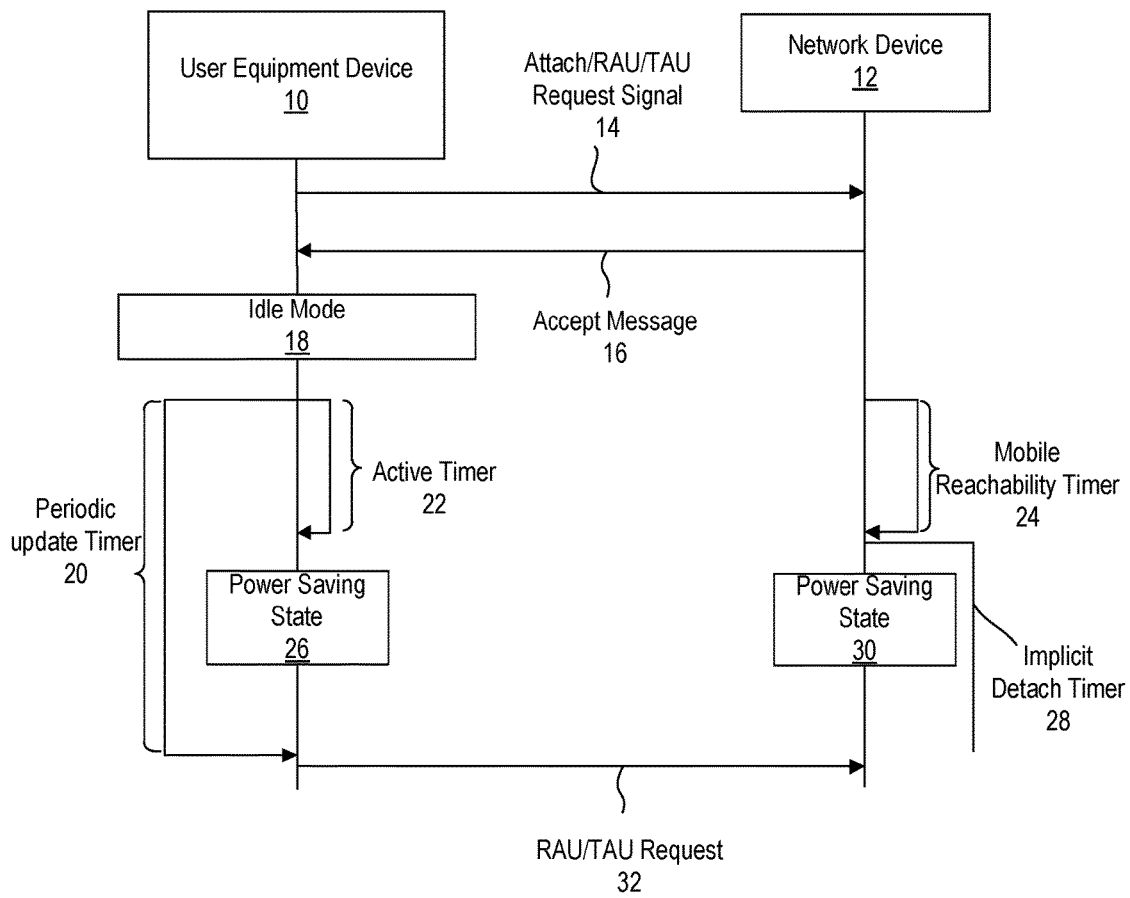
FIG. 1 is a signalling diagram illustrating signalling arising between a mobile radio communications device and a mobile radio communications network for the control of a power saving mode and according to one aspect of the present invention.
Figure 2:
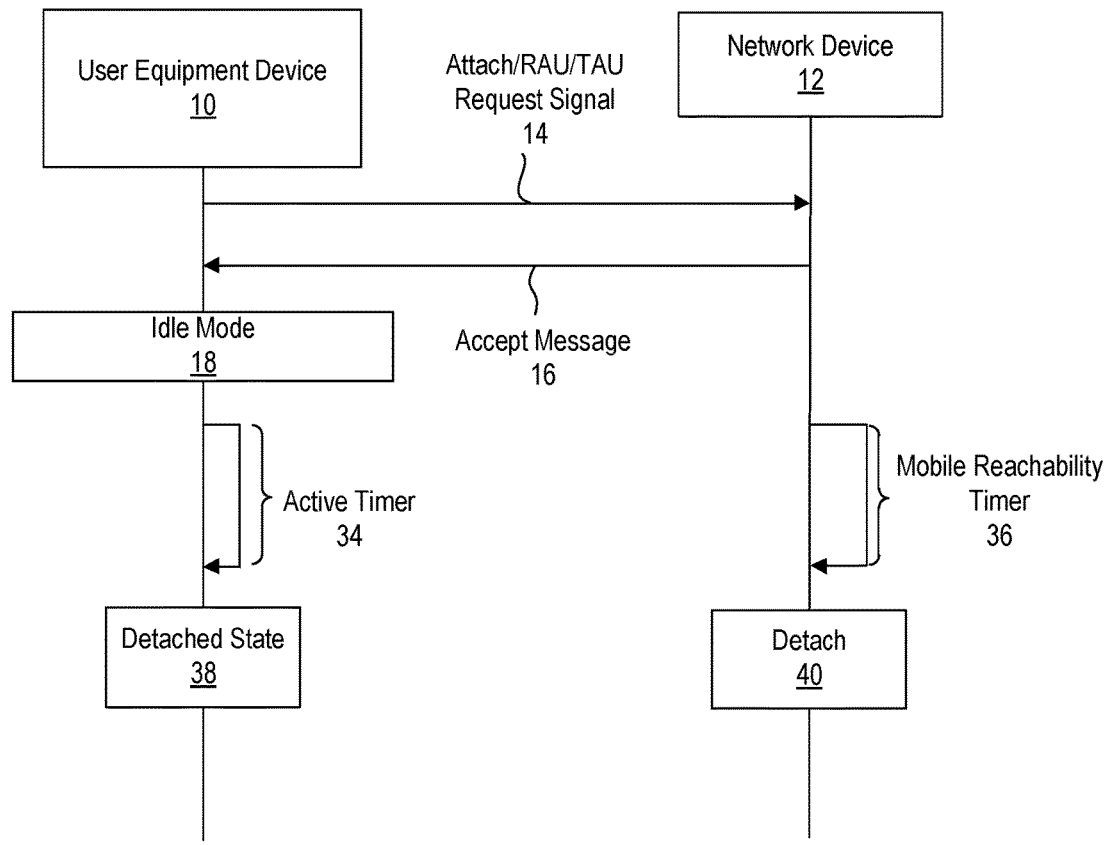
FIG. 2 is a signalling diagram illustrating signalling arising between a mobile radio communications device and a mobile radio communications network for the control of a power saving mode and according to another aspect of the present invention.
Figure 3:
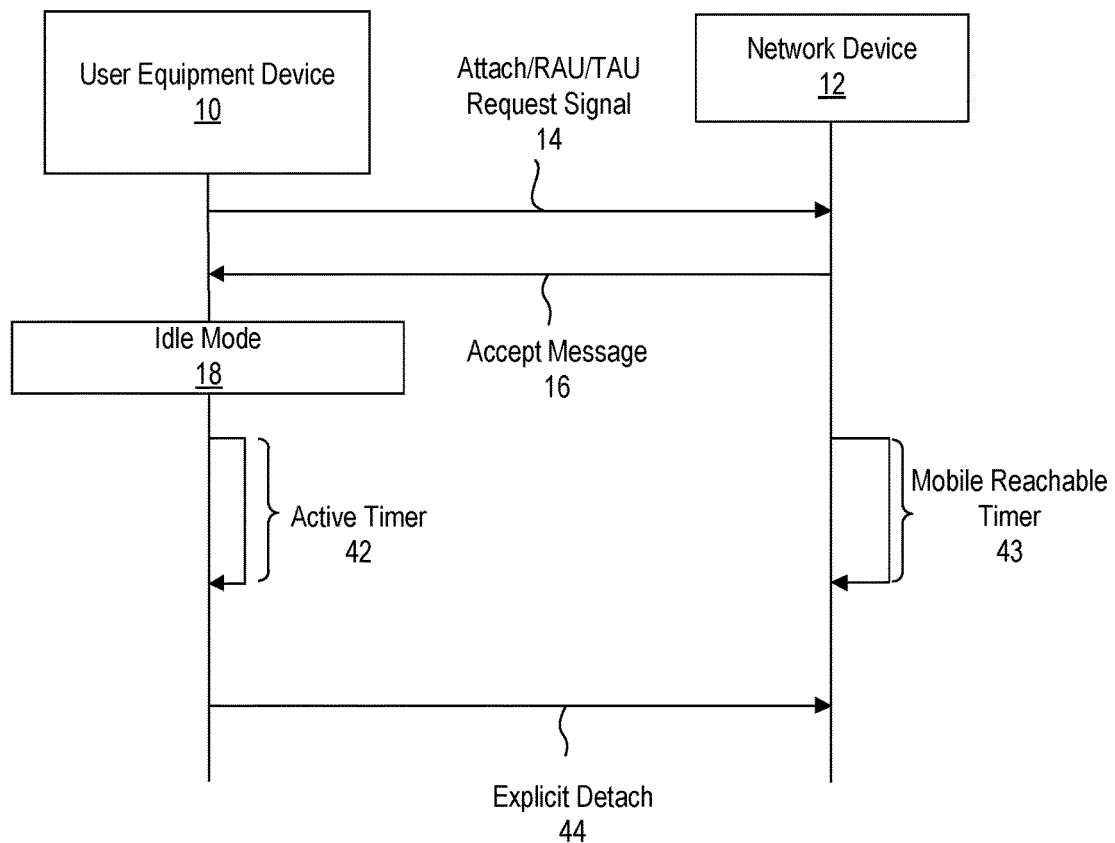
FIG. 3 is a signalling diagram illustrating signalling arising between a mobile radio communications device and a mobile radio communications network for the control of a power saving mode and according to yet another aspect of the present invention.

Turning to FIGS. 1-3, there are illustrated signalling exchanges between a mobile radio communications device, i.e. mobile terminal such as a, User Equipment (UE) device 10 and a network schematically represented in the illustrated embodiments of FIGS. 1-3 as a Mobile Management Entity/Serving GPRS Support Node 12.

According to each of the three examples represented by FIGS. 1-3, the power saving features according to the present invention first arise in relation to an Attach/RAU/TAU request signal 14 sent from the UE 10 to the network device 12 and which, in addition to the inclusion of Periodic Update Timer and Active timer information, also includes the identification of at least one of a plurality of possible power saving modes available to the mobile terminal. Such indication is provided by way of a specific parameter included within the Attach/RAU/TAU request 14 and which can be characterised as comprising a mobile terminal power saving mode preference parameter.

As part of the ongoing Attach/RAU/TAU procedure, an accept message 16 is returned from the network device 12 to the UE 10 which, in addition to confirmation of the Periodic Update Timer and active timer data, also includes confirmation of a power saving mode identified by the network device 12 for employment by the UE 10.

Subsequent to the receipt of the Attach/RAU/TAU accept signal 16, the UE 10 then enters its idle mode 18.

Subsequent to entry into its idle mode, the operation of the UE 10 continues according to the confirmed power saving mode to be employed and three examples of which are discussed in further detail with reference to FIGS. 1, 2 and 3 respectively.

Turning first to FIG. 1, and as noted above, during an Attach or RAU/TAU procedure, the UE 10 specifies its preferred Periodic Update Timer value, Active timer value and UE power save mode preference in the Attach Request or RAU/TAU Request messages 14. The 'UE power-save mode preference' parameter defines the power save mode that is preferred by the mobile UE 10 i.e. Power Save State, Implicit Detach, Explicit Detach or any other appropriate power-save mode.

The network device (MME/SGSN) 12 confirms the Periodic Update Timer value, Active timer value and power-save mode in the Attach Accept message or RAU/TAU accept message 16. The 'power save mode' parameter contained within message 16 defines the power save mode to be deployed by both, the UE 10 and the network as represented by the MME/SGSN 12. The network sets the Active tinier value to the mobile reachable timer value.

When the UE 10 enters idle mode 18, it can start the Periodic Update Timer 20 and the Active timer 22 and the network can start the mobile reachability timer 24. At the expiry of the Active tinier 22 period, the UE 10 enters Power Saving State 26 (such as described above and known from TR23.887. s7.1.3.3). In the Power Saving State 26 the UE 10 deactivates its Access Stratum functions and can also stop all idle mode procedures, but continues to run the periodic TAU/RAU timer 20.

At the expiry of Mobile reachable timer 24 the network (MME/SGSN) 12 starts the Implicit detach timer 28 and enters its Power Saving State 30. In the Power Saving State 30 the network 12 does not page the UE 10.

At the expiry of Periodic Update Timer 20 on the UE 10 side, the UE 10 triggers RAU/TAU Request 32 and exits the Power Saving State 26. Within the RAU/TAU Request 32, the UE 10 can again express its preference for a power save mode in the UE power save mode preference parameter, and which can comprise the same power save mode, or a different one.

Turning now to FIG. 2, another example is shown and wherein the UE 10 enters idle mode 18 after the aforementioned Request 14 and Accept 16 signalling and starts the Active timer 34, and the network 12 starts the mobile reachability timer 36. At the expiry of the Active timer 34 the UE 10 implicitly transfers to a detached state 38. The UE 10 is thus implicitly detached and the network (SGSN/MME) 12 also implicitly detaches 40 the UE 10 at expiry of the mobile reachability timer 36 that has the same duration as the Active tinier 34. In this manner, the UE 10 can be implicitly detached from the network 12 according to an Implicit Detach power-save mode such as described in TR23.887, s7.1.3.4.3.3.

Turning now to FIG. 3, a further example is shown and wherein the UE 10 enters idle mode 18 again after Request 14 and Accept 16 signalling exchanges and starts Active timer 42 and the network 12 starts the mobile reachability timer 43. At the expiry of the Active timer 42 the mobile terminal triggers a request for Explicit Detach 44 for example in accordance with the mobile terminal initiated Detach procedure disclosed in Technical Specifications TS24.301 and TS24.008. For example, in such described advantages, the detach procedure can be initiated by the UE by sending a DETACH REQUEST message and the Detach type IE included in the message indicates whether the detach is due to a "switch off" or not. The Detach type IE also indicates whether the detach is for EPS services only, for non-EPS services only, or for both.

As noted above, FIG. 4 comprise a schematic of a mobile radio communications device such as the UE 10 identified in FIGS. 1-3 and comprising standard mobile radio communications device functionality such as an antenna 46 operatively connected to transmission/reception circuitry 48 operatively connected to control circuitry 50 which is in turn, connected to memory functionality 52 and a user interface 54. As again illustrated schematically, the control circuitry 50 includes sleep mode preference functionality 56 sends sleep mode initiation functionality 58. Such functionality can be arranged to operate in accordance with any one or more of the irrelevance of FIGS. 1-3 wherein the sleep mode preference functionality 56 operative to identify one of a possible plurality of sleep mode functions that can be stored in the memory functionality 52 as a preferred sleep mode or, indeed, indicate a plurality of sleep modes but with a ranking of preference.

Such preference, whether it refer to a single sleep mode, or a ranked order of sleep modes, is then arranged by the control circuitry 50 to be transmitted by way of the transmission/reception circuitry 48 and antenna 46 from the UE 10, to the network. Signalling to the UE 10 serving to confirm which of the, ideally preferred, power-save modes proposed in the signalling from the UE 10 is actually going to be initiated and employed. Such indication is received by way of the antenna 46 and transmission/reception circuitry 48 then initiated within sleep mode initiation functionality 58 of the controller 50 so that the UE 10 can then operate in accordance with an appropriate sleep mode given UE device 10 preferences and also network consideration.

Figure 5:
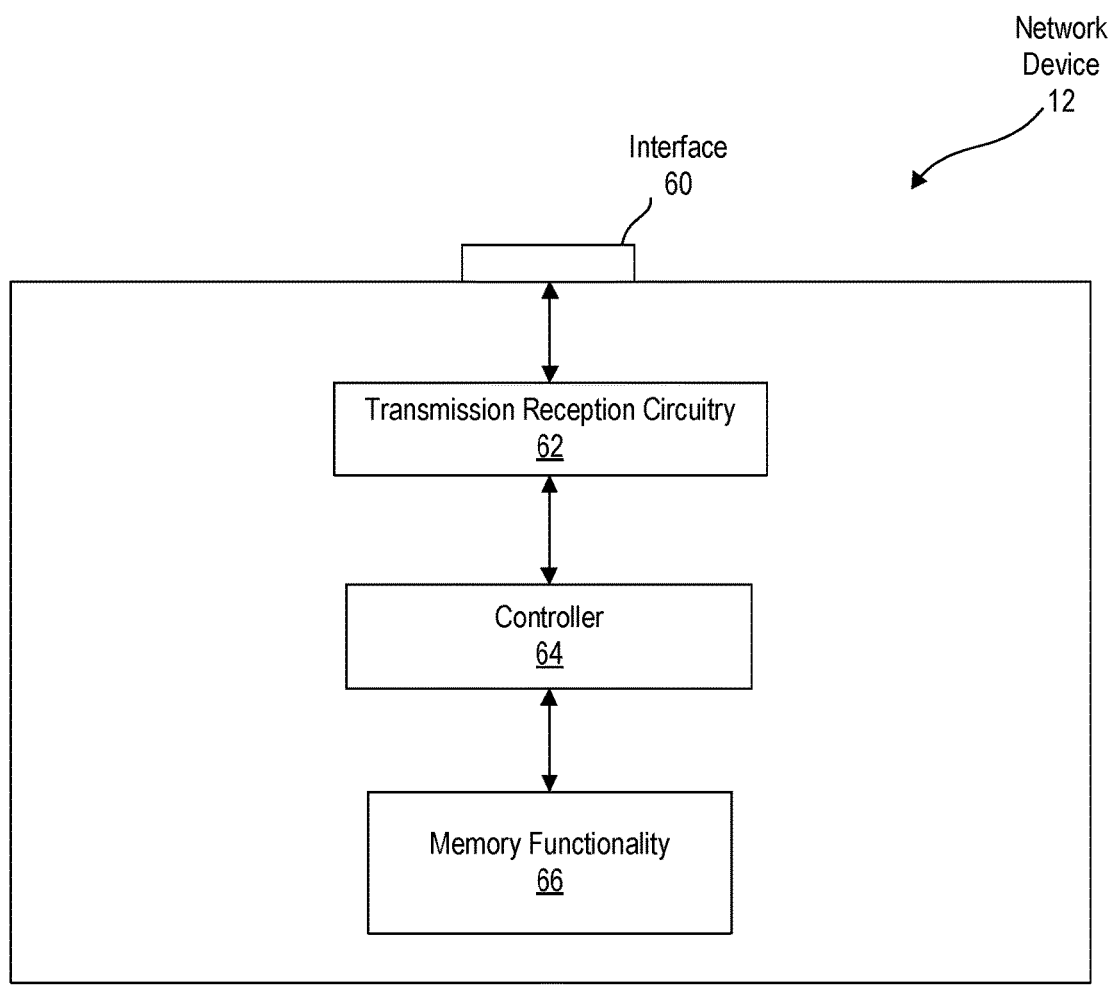
FIG. 5 is a schematic representation of a mobile radio communications network device arranged to operate in accordance with one aspect of the present invention.

Turning now to FIG. 5, there is provided a similarly schematic illustration but this time of a mobile radio communications network device, such as the SGSN/MME 12 discussed and illustrated in relation to embodiments of FIGS. 1-3.

The network device contains a functionality of an interface 60 preferably connected to a transmission reception circuitry 62 which, in turn, is operatively connected to a controller 64 in turn connected to memory functionality 66.

Figure 4:
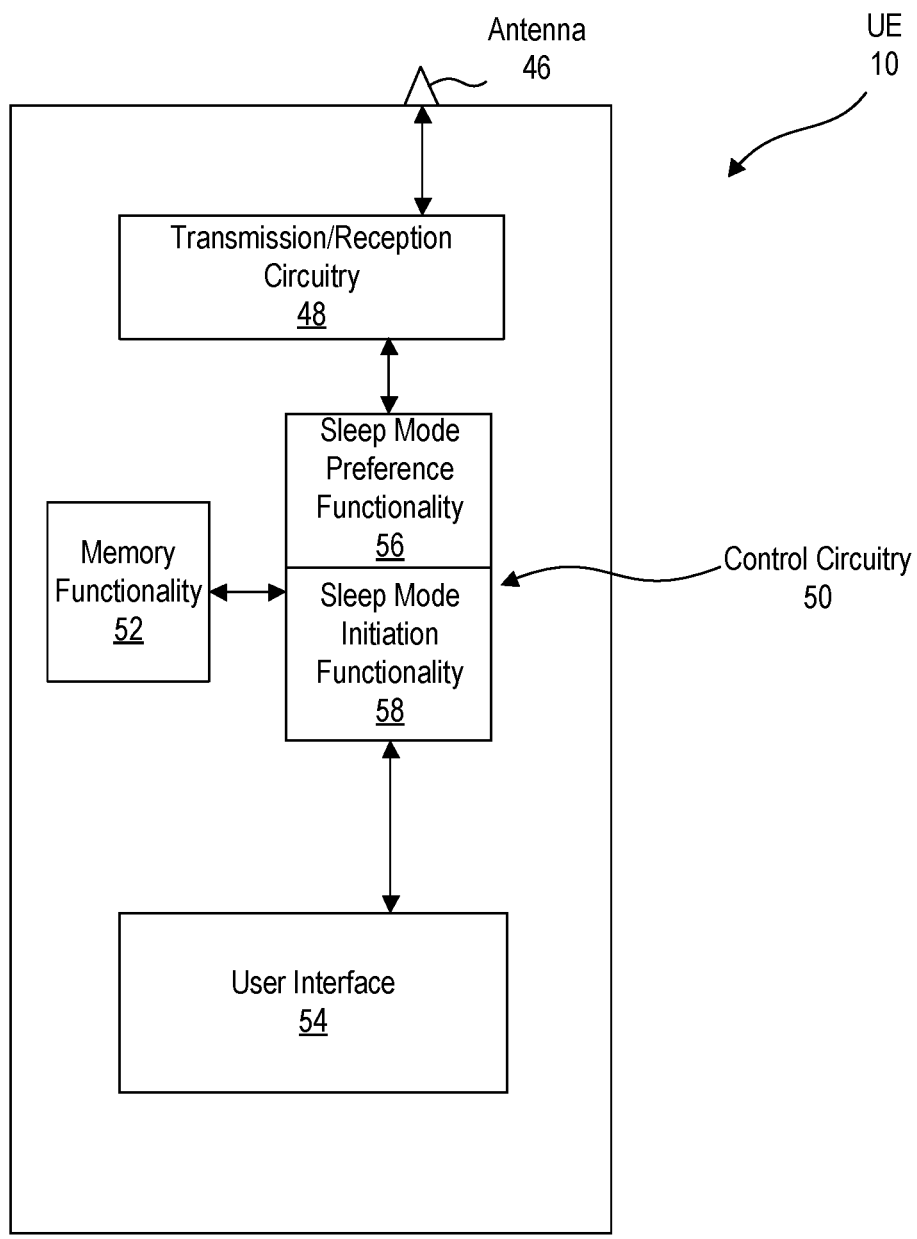
FIG. 4 is a schematic illustration of a mobile radio communications device arranged to operate in accordance with an embodiment of the present invention.

As will be appreciated, the controller 64 is arranged to indicate one or more power-saving modes preferred for adoption by a UE 10 such as that in FIG. 4 and to determine, also advantageously based on network considerations, which of the preferred power-saving modes is to be employed by the UE 10 and, returns appropriate control signalling under control of the control functionality 64 so as to initiate the appropriate power-saving mode within the UE 10. It would be appreciated, the power-saving mode may comprise that indicated as the preferred mode of the UE 10 or they comprise a selection from the ranking order of preferred modes, illustrated by the UE 10.

It should of course be appreciated that, for example, although described in relation to 3G Radio Access Technology, the invention is equally applicable to other RATs including 2G technology. As such, the above mentioned reference to 3G can include reference to 2G and accordingly reference to RAU/TAU messages can optionally refer to LA Update messages, and reference to SGSN/MME can include reference to MSC devices will be appreciated, the invention is particularly advantageous in providing a new mechanism for power-save control within a mobile radio communications device and network and that allows for increased/improved power save options for the UE mobile terminal and the network. It also allows for a power-save mode that better suits the specific mobile terminal circumstances and requirements, and further can allow for a dynamic control and change of the power-save modes while the mobile terminal is travelling, i.e. non-stationary.

Although the present invention has been explained with reference to the exemplary embodiments, the present invention is not limited by the above exemplary embodiments. Various modifications, obvious to those in the art, can be made to the configurations and details of the present invention within the scope of the invention.

This application is based upon and claims the benefit of priority from United Kingdom patent application No. 1319226.5, filed on Oct. 31, 2013, the disclosure of which is incorporated herein in its entirety by reference.

REFERENCE SIGNS LIST

10 UE
12 Network device
14 Attach/RAU/TAU request signal
16 Accept message
18 Idle mode
20 Periodic Update Timer
22 Active timer
24 Mobile reachability timer
26 Power Saving State
28 Implicit detach timer
30 Power Saving State
32 RAU/TAU Request
34 Active timer
36 Mobile reachability timer
38 Detached state
40 Detach
42 Active timer
43 Mobile reachability timer
44 Explicit Detach
46 Antenna
48 Transmission/reception circuitry
50 Control circuitry
52 Memory functionality
54 User interface
56 Sleep mode preference functionality
58 Sleep mode initiation functionality
60 Interface
62 Transmission reception circuitry
64 Controller
66 Memory functionality

The invention claimed is:

1. A mobile radio communications device for communication with a mobile radio communications network, the mobile radio communications device comprising:
   a transmission and reception unit configured to send non-access stratum or access stratum signalling to the network, the non-access stratum or access stratum including a preference indication of a preference of the mobile radio communications device to use a plurality of possible power saving modes, and to receive a confirmation, returned by the network, of a selected power-saving mode of the plurality of power saving modes indicated by the preference indication, the confirmed selected power saving mode to be employed by the mobile radio communications device; and
   a controller configured to initiate operation of the confirmed selected power saving mode.

2. A mobile radio communications device as claimed in claim 1, wherein the transmission and reception unit is further configured to include the preference indication within any one or more of an Attach Request, a Tracking Area Update request or a Routing Area Update request.

3. A mobile radio communications device as claimed in claim 1, wherein the signalling including the preference indication comprises non-access stratum signaling, the non-access stratum signaling further including at least one of a Periodic Update Timer or an Active timer value.

4. A mobile radio communications device as claimed in claim 1, wherein the confirmation is received by non-access stratum signalling.

5. A mobile radio communications device as claimed in claim 1, wherein the controller is further configured to initiate an active timer for timing an active time period prior to entry into a power saving state.

6. A mobile radio communications device as claimed in claim 1, wherein the controller is further configured to activate a periodic update timer for timing a period on expiry of which the mobile radio communications device is to exit a power-saving state.

7. A mobile radio communications device as claimed in claim 1, wherein the controller is further configured to issue a Routing Area Update request or Tracking Area Update request subsequent to the mobile radio communications device leaving its power saving state.

8. A mobile radio communications network device for communicating with a mobile radio communications device within a mobile radio communication network environment, comprising:
- a transmission and reception unit configured to receive non-access stratum or access stratum from the mobile radio communications device, the non-access stratum or access stratum including a preference indication of a preference of the mobile radio communications device to use a plurality of possible power saving modes; and
- a controller configured to, responsive to the preference indication, return a confirmation of a selected power saving mode, of the plurality of power saving modes indicated by the preference indication, the confirmed selected power saving mode to be employed by the mobile radio communications device;
- wherein the preference indication is arranged to rank a plurality of power saving modes in order of preference and the mobile radio communications network device is arranged to select a power saving mode based on the rank of the plurality of power saving modes.

9. A mobile radio communications network device as claimed in claim 8, wherein the mobile radio communications network device is configured to select a power saving mode based on the contents of said preference indication and at least one network consideration.

10. A mobile radio communications network device as claimed in claim 9, wherein the controller is configured to select a power saving mode based on a network consideration comprising at least one of subscription information, capability information and resource information for the mobile radio communications device.

11. A method of controlling a mobile radio communication device for communication with a mobile radio communications network the method including:

sending a non-access stratum signal or access stratum signal to the network, the non-access stratum signal or access stratum signal including a preference indication of a preference of the mobile radio communications device to use a plurality of possible power saving modes;

receiving a confirmation, returned by the network, of a selected power saving mode, of the plurality of power saving modes indicated by the preference indication, the confirmed selected power saving mode to be employed by the mobile radio communications device; and initiating the confirmed power saving mode in the mobile radio communications device;

wherein the preference indication is arranged to rank the plurality of power saving modes in order of preference.

12. A method of controlling a mobile communications network for communication with a mobile radio communications device, the method including;

receiving non-access stratum or access stratum signalling from the mobile radio communications device, the non-access stratum or access stratum including a preference indication of a preference of the mobile radio communications device to use a plurality of possible power saving modes; and responsive to the preference indication, confirming to the mobile radio communications device a selected power saving mode of the plurality of power saving modes indicated by the preference indication, the confirmed selected power saving mode to be employed by the mobile radio communications device, wherein the preference indication is arranged to rank a plurality of power saving modes in order of preference and the mobile radio communications network device selects a power saving mode based on the rank of the plurality of power saving modes.

* * * * *